US010521702B2

(12) United States Patent
Gauchet et al.

(10) Patent No.: US 10,521,702 B2
(45) Date of Patent: Dec. 31, 2019

(54) METHOD FOR ESTIMATING AND FORECASTING AN ENERGY PRODUCTION INDICATOR FOR A SOLAR SYSTEM

(71) Applicant: ELECTRICITE DE FRANCE, Paris (FR)

(72) Inventors: Charlotte Gauchet, Suresnes (FR); Nicolas Paul, Montreuil (FR); Stephanie Dubost, Paris (FR)

(73) Assignee: ELECTRICITE DE FRANCE, Paris (FR)

(*) Notice: Subject to any disclaimer, the term of this patent is extended or adjusted under 35 U.S.C. 154(b) by 210 days.

(21) Appl. No.: 15/736,897

(22) PCT Filed: Jun. 7, 2016

(86) PCT No.: PCT/FR2016/051364
§ 371 (c)(1),
(2) Date: Dec. 15, 2017

(87) PCT Pub. No.: WO2016/203134
PCT Pub. Date: Dec. 22, 2016

(65) Prior Publication Data
US 2018/0365517 A1  Dec. 20, 2018

(30) Foreign Application Priority Data
Jun. 16, 2015 (FR) ...................... 15 55518

(51) Int. Cl.
*G06K 9/46* (2006.01)
*G06K 9/62* (2006.01)
(Continued)

(52) U.S. Cl.
CPC ........... *G06K 9/627* (2013.01); *G06K 9/4604* (2013.01); *G06T 7/246* (2017.01); *G06T 7/73* (2017.01);
(Continued)

(58) Field of Classification Search
CPC ........ G06K 9/4604; G06K 9/627; G06T 7/10; G06T 7/246; G06T 7/73;
(Continued)

(56) References Cited

U.S. PATENT DOCUMENTS 9,222,702 B2 * 12/2015 Goldberg ................ F24S 50/20
2010/0309330 A1   12/2010 Beck
(Continued)

FOREIGN PATENT DOCUMENTS

JP   2011137612 A  *  7/2011
JP   2015059923 A  *  3/2015 ............. G01W 1/12
(Continued)

OTHER PUBLICATIONS

Modica et al. ("Short-range solar radiation forecasts in support of smart grid technology," Proc. 2010 1st Conf. on Weather, Climate and the New Economy) (Year: 2010).*
(Continued)

*Primary Examiner* — Yubin Hung
(74) *Attorney, Agent, or Firm* — Drinker Biddle & Reath LLP (57) ABSTRACT

A method for estimating and forecasting an energy production indicator for a solar system. The method comprises, in particular, the steps of: a) receiving images of the sky taken from the ground, each image comprising an optical marker; b) extracting values of pixels and locating of image pixels from the received images; c) determining distances between the located pixels and the optical marker of the image; d) generating a vector of parameters from a pixel classification, according to the extracted values and the determined distances; e) comparing parameters of the generated vector with predetermined parameters, the predetermined parameters being respectively associated with energy production indicators; f) estimating the energy production indicator of
(Continued)

the solar system from energy production indicators of the predetermined parameters compared to the generated vector.

15 Claims, 10 Drawing Sheets

(51) Int. Cl.
| | | |
|---|---|---|
| *G06T 7/10* | (2017.01) | |
| *G06T 7/73* | (2017.01) | |
| *H02S 99/00* | (2014.01) | |
| *G06T 7/246* | (2017.01) | |
| *H02S 50/00* | (2014.01) | |

(52) U.S. Cl.
CPC ............... *H02S 50/00* (2013.01); *G06T 7/10* (2017.01); *G06T 2207/20076* (2013.01); *G06T 2207/30192* (2013.01); *G06T 2207/30204* (2013.01); *H02S 99/00* (2013.01)

(58) Field of Classification Search
CPC . G06T 2207/20076; G06T 2207/30192; G06T 2207/30204; H02S 50/00; H02S 99/00
See application file for complete search history.

(56) References Cited

U.S. PATENT DOCUMENTS

| | | | |
|---|---|---|---|
| 2012/0121125 A1 | 5/2012 | Dimov | |
| 2013/0258068 A1* | 10/2013 | Schmidt | G01W 1/10 348/49 |
| 2014/0046597 A1 | 2/2014 | Hoff | |
| 2014/0083413 A1* | 3/2014 | Bibi | G01W 1/02 126/601 |
| 2014/0320639 A1* | 10/2014 | Schoeberl | G01N 15/0205 348/135 |
| 2014/0327769 A1 | 11/2014 | Hamann et al. | |
| 2017/0031056 A1* | 2/2017 | Vega-Avila | G01W 1/12 |

FOREIGN PATENT DOCUMENTS

| | | |
|---|---|---|
| WO | 2013/181408 A2 | 12/2013 |
| WO | 2015/073347 A1 | 5/2015 |

OTHER PUBLICATIONS

Geraldi et al. ("An advanced model for the estimation of surface solar irradiance under all atmospheric conditions using MSG/SEVIRI data," IEEE Trans. on Geoscience and Remote Sensing, vol. 50, No. 8, Aug. 2012) (Year: 2012).*

Alonso et al. ("Sky camera imagery processing based on a sky classification using radiometric data," Energy, vol. 68, Apr. 2014) (Year: 2014).*

Alonso et al. ("Determination of the sun area in sky camera images using radiometric data," Energy Conversion and Management, vol. 78, Feb. 2014) (Year: 2014).*

Chow et al., "Intra-hour forecasting with a total sky imager at the UC San Diego solar energy testbed," Solar Energy, Pergamon Press, Oxford, GB, Aug. 19, 2011, vol. 85 (11), pp. 2881-2893.

Dambreville, "Prévision du rayonnement solaire global par télédétection pour la gestion de la production d'énergie photovoltaïque," Thesis, University of Grenoble, with English language abstract, Oct. 16, 2014, 139 pages.

Dambreville et al., "Very short term forecasting of the Global Horizontal Irradiance through Helioclim maps,", The 5th International Renewable Energy Cogress IPEC, Mar. 25-27, 2014, Hammamet, Tunisia, IEEE, Piscataway, NJ, USA, Mar. 24, 2014, pp. 1-6.

Gauchet et al., "Surface solar irradiance estimation with low-cost fish-eye camera," Workshop on Remote Sensing Measurements for Renewable Energy, May 2012, Risoe, Denmark, 5 pages.

* cited by examiner

300 - Receive images
310 - Determine distances between pixels and optical reference marker(s)
320 - Generate vector of parameters
330 - Compare vector of parameters
340 - Determine weighted mean and standard deviation
350 - Apply clear sky model
360 - Estimate energy production indicator 102 - Database

500. Irradiation measured at INST_T
502. Images of sky taken at INST_T
510. Application of clear sky model
512. Partitioning and calculating separation distances
520. Association of irradiations and parameter values 102. Database

METHOD FOR ESTIMATING AND FORECASTING AN ENERGY PRODUCTION INDICATOR FOR A SOLAR SYSTEM

CROSS-REFERENCE TO RELATED APPLICATIONS

This application is the U.S. national phase of the International Patent Application No. PCT/FR2016/051364 filed Jun. 7, 2016, which claims the benefit of French Application No. 15 55518 filed Jun. 16, 2015, the entire content of which is incorporated herein by reference.

FIELD

The invention relates to the field of estimating and forecasting the energy production of one or more solar energy conversion systems (referred to as solar systems hereinafter) such as solar panels or solar thermal collectors for example.

BACKGROUND

For the conversion means of solar systems used for generating energy such as electrical or thermal energy, their production depends on the incident solar irradiation to which they are exposed (referred to below as irradiation). A typical solar panel produces electrical energy which varies with the sunlight and brightness of the environment around the panel.

Forecasting the irradiation of a solar system enables anticipating the amount of energy that will be produced over a future time horizon. There are different approaches to forecasting the irradiation of such a system, including:
  forecasts using meteorological models (forecast horizon ranging from several hours to several days);
  forecasts based on irradiation measurements taken by a measurement instrument on the ground (such as a pyranometer), mathematical models being used to predict the values of upcoming measurements on the basis of historical measurements (forecast horizon ranging from a few minutes to several hours);
  forecasts by processing satellite images, and estimating the solar radiation received at ground level from satellite data (forecast horizon of several minutes to several hours);
  forecasts using images of the sky taken from the ground, to determine the movement of cloud cover and thus deduce the irradiation on the ground (forecast horizon of up to several minutes).

With the latter approach, i.e. forecasting by processing images of the sky taken from the ground, estimating and forecasting solar radiation on the ground can be done with good accuracy, either in real time or on the basis of an approaching forecast horizon (5 to 15 minutes for example). "Forecast horizon" is understood to mean the time interval between the moment the forecast is made and the moment when the expected event occurs.

Generally, forecasts based on images of the sky taken from the ground comprise at least three phases, which are:
  locating a masking cloud cover,
  estimating the motion of the masking cloud cover, and
  determining the solar radiation at ground level based on the one or more masking cloud covers detected and their estimated movements.

During the first phase, the presence of a masking cloud cover is conventionally recognized from an image taken in an area of interest (typically near solar panels). From the location of the masking cloud cover in the image, a cloud cover index for the area of interest can be calculated.

In the second phase, the movement of the detected masking cloud cover or masks is analyzed.

Thirdly, the images are translated into ground-level radiation values based on the detected cloud covers and their movements. To this end, processing methods that are known per se can be used to convert the luminous intensity of each pixel (pixel value) of the images, into a raw ground level irradiation value. For illustrative purposes, one of the possible processing methods is disclosed in patent US20100309330.

However, it turns out that cloud covers are usually considered as impacting the radiation at ground level regardless of their position relative to the area of interest. A cloud cover which is at the earth's horizon relative to the area of interest, however, does not have the same influence on the ground-level irradiation received as would other cloud cover at the zenith for example. A cloud cover at zenith has pixels that more directly impact the ground-level radiation received. Significant differences can thus appear between the value of the estimated or predicted ground-level radiation and the irradiation actually received in the area of interest.

These differences skew the estimation and forecast of the energy production of solar systems, and as a result adversely affect the optimization of energy management (in this case with an incorrect assessment of the amount of energy actually produced and/or to be produced by other production devices to compensate).

There is therefore a need to develop a more accurate method of estimating and forecasting the energy production of a solar system.

The invention improves the situation in this regard.

SUMMARY

The object of the invention is to overcome the above disadvantages, in particular by proposing to take into account the location of clouds in an image of the sky taken from the ground, in order to estimate the energy production of a solar system.

To this end, a first aspect of the invention relates to a method for estimating an energy production indicator for a solar system, comprising the steps of:
  a) receiving images of the sky taken from the ground in an area of land containing the solar system, each received image comprising at least one optical reference marker;
  b) extracting pixel values and determining pixel locations from an image obtained from the received images;
  c) determining distances between the located pixels and the at least one optical reference marker of the image obtained from the received images;
  d) generating a vector of parameters from a classification of the pixels according to the extracted values and the determined distances;
  e) comparing the parameters of the generated vector with predetermined parameters, the predetermined parameters being respectively associated with energy production indicators;
  f) estimating the energy production indicator for the solar system based on the energy production indicators of the predetermined parameters compared to the generated vector.

The optical reference marker of the received images may be for example:

the optical center of the video or still camera which obtained the image, particularly when said video or still camera is provided with a lens having a field of view greater than 170 degrees (camera with a "fish eye" lens), the center of the image when captured by a video or still camera with a lens having a field of view smaller than 170 degrees, the location of the sun in the image obtained from the received images, or other.

According to a preferred embodiment, when the optical reference marker is the location of the sun, the distance to the sun is determined between the pixels and the center of the sun in the image of the sky.

The energy generation indicator is data that may be directly related to the energy production of the solar system, or may be data corresponding to a magnitude that impacts energy production. The energy indicator may be in particular:

solar radiation at the solar system or in the area of land from which the received images are taken;

an electrical energy production of the solar system;

a thermal energy production of the solar system;

or other data related to energy production having a first-order relationship to solar radiation.

According to preferred but non-limiting embodiments, the energy production indicators are solar radiation data and/or electrical energy production data.

Classification of the pixels according to their respective values and distances from the optical reference marker allows identifying the elements of the sky which correspond to the pixels of the image (typically clear sky, clouds, or sun) and the location of these elements in the sky relative to the area where the solar system is installed.

The determined distances between the pixels and the optical reference marker enable characterizing the respective contributions of the identified elements in the sky, to the energy production of the solar system. For example, the greater the distance separating the pixel corresponding to a cloud and the optical reference marker, the smaller the pixel's contribution to the energy production estimate, and vice versa.

Estimating the energy production indicator can thus be based on predetermined energy production indicators (irradiation of solar panels, actual electrical energy production from solar panels, or other) whose significance can be moderated by coefficients that are relative, or even proportional, to the distances separating pixels from the optical center of the image or from one or more points of interest in the image, such as the location of the sun. The estimate is then more accurate than when assigning the same contribution to all pixels of the image as is done in the prior art, or at least assigning the same contribution regardless of the positions, in the image, of elements detected in the sky.

A particular weight may be assigned to energy production indicators obtained from parameters corresponding to white clouds. This particular weight allows the estimation to take into account the additional contribution of white clouds. Indeed, white clouds are important secondary sources of solar radiation, of increasing intensity the closer they are to the sun in the image. The weight of the indicators associated with the predetermined parameters corresponding to white clouds can thus be increased in the estimate. This additional weight makes the estimate of the energy production indicator even more precise.

"Solar system" is understood to mean any system configured to convert solar energy into other energy, for example electricity or heat. A solar system can be, for example, one or more photovoltaic panels, thermal panels, solar water heaters, or other.

According to an advantageous embodiment, in step f) the estimation of the energy production indicator is further derived from a weighting of the production indicators associated with the predetermined parameters, this weighting being based on the differences in value between the parameters of the vector and the predetermined parameters.

It is then possible to assign greater or lesser weights to the predetermined parameters according to their relevance in relation to the vector of parameters, so as to target more specifically the predetermined parameters that are equal or close to the parameters of the vector. As a purely illustrative example, the weight of the indicators associated with the closest predetermined parameters of the vector can be increased in the estimate, and the weight of the indicators associated with the other predetermined parameters can be decreased. Such weighting allows further improving the quality of the energy production estimation.

According to various possible embodiments, the weighting can be applied to indicators associated with:

the set of predetermined parameters, or predetermined parameters with values close to the generated vector of parameters, for example such as predetermined parameters having values within a predefined range around the values of the vector, such as a range between +30% and −30% of the values of the generated vector.

Advantageously, in step d) the vector of parameters in which the pixels are classified comprises at least:

a first category of parameters corresponding to a clear sky, a second category of parameters corresponding to the sun, a third category of parameters corresponding to clouds.

In this embodiment, the pixels are thus classified into three categories which enable defining to which element of the sky they correspond.

In one possible embodiment, only the parameters corresponding to clouds are compared with the predetermined parameters. This reduces the number of calculations (as opposed to a comparison to all parameters in step e)) while maintaining an accurate estimate of the energy production based on the one of the categories of sky elements that most directly impacts the variations in production of a solar system.

Advantageously, the third category of parameters comprises:

a first sub-category of parameters corresponding to white clouds, in which are classified pixels having a value greater than or equal to a threshold, a second sub-category of parameters corresponding to dark clouds, in which are classified pixels having a value below the threshold.

As a purely illustrative example, the threshold corresponds to a pixel luminance value whose signal intensity I is defined by the following linear combination (where the coefficients are the ITU-R BT.709 standardized universal weights):

$$I = 0.2126\ Ir + 0.7152\ Iv + 0.0722\ Ib$$

The first and second sub-categories allow making a distinction between white clouds and dark clouds, which do not have the same impact on the energy production of a solar system. Indeed, a white cloud can act as a secondary source of solar radiation, while a dark cloud can completely absorb the solar radiation.

According to one embodiment of the invention, the method further comprises a step of determining a proportion of cloud cover in the image obtained from the received images, based on the pixels classified in the third category of parameters.

The proportion of cloud cover can be used for assessments of weather conditions, in particular to verify or predict the presence in the sky of masking cloud cover. For example, if the proportion of pixels classified in the third category (i.e. the "cloud" category) is large (number of pixels of the image that are in the "cloud" category is greater than or equal to a predefined threshold), the image obtained from the received images can be considered to be an image of a cloudy sky.

Moreover, this assessment can be refined by segmenting the image into multiple parts (eight in this case), and determining the proportion of cloud cover in each part of the image.

According to one advantageous embodiment, in step b) the image obtained from the received images is an image generated by the following steps:

from the received images, retrieving images taken at at least a first moment and a second moment, the first moment preceding the second moment;
determining the location of pixel values in the images respectively taken at the first and second moments;
comparing the locations of the pixel values at the first moment and the second moment;
determining the movements, between the first and second moments, of at least some of the located pixel values;
generating the image of the sky for a third moment based on the determined movements, the third moment being later than the second moment.

The third moment may correspond to a given time horizon (i.e. a future moment for when the estimation of the energy production indicator of the solar system is desired). By applying steps b) to e) of the estimation method to an image generated for the third moment, the energy production at a future moment can be predicted. The proposed method can thus be a method for estimating and forecasting an energy production indicator.

Advantageously, the method further comprises a step of determining a range of energy production indicators that is based on a standard deviation calculated from the weighted root mean square deviation between production indicators of predetermined parameters and the estimated production, the mean being weighted according to differences in values between the parameters of the generated vector and the predetermined parameters.

This standard deviation is used to define a confidence interval around the estimated energy production indicator, giving the estimate an upper bound and a lower bound for the expected energy production.

The method may further comprise a step of receiving data concerning:
actual solar radiation at ground level in the area of land, or
actual energy production of the solar system.

The received data may in particular be used to calibrate or correct the energy production indicators associated with the predetermined parameters.

In this manner, the predetermined parameters can be calibrated, reinitialized, and/or adjusted according to the measurements of actual irradiation or production at ground level, which allows refining the data used for the estimate and therefore making a more accurate and robust forecast of the energy production of the solar system. For example, the received data may come from an average pyranometer measurement or a measurement of the energy production of the solar system itself.

A second aspect of the invention provides a device for estimating an energy production indicator for a solar system, said estimation device comprising at least:
an input interface for receiving images of the sky taken from the ground in an area of land containing the solar system;
a memory configured to store:
the received images of the sky, and
predetermined parameters respectively associated with energy production indicators;
a data processing unit connected to the input interface and to the memory.

The data processing unit is configured to implement the above method for estimating the energy production indicator for the solar system.

According to one embodiment of the device, the input interface is:
connected to an image capture device oriented towards the sky in the area of land, the image capture device being fitted with a lens having a field of view greater than 170 degrees; and/or
configured to receive data concerning:
actual solar radiation at ground level in the area of land, or
actual energy production of the solar system.

The data received may more particularly be data emitted by a pyranometer placed in the vicinity of the solar system.

The present invention also relates to a computer program comprising instructions for implementing the method described above, when the program is executed by a data processing unit such as a processor.

This program may use any programming language (for example, an object-oriented language or some other language), and may be in the form of readable source code, partially compiled code, or fully compiled code.

Figure 3:
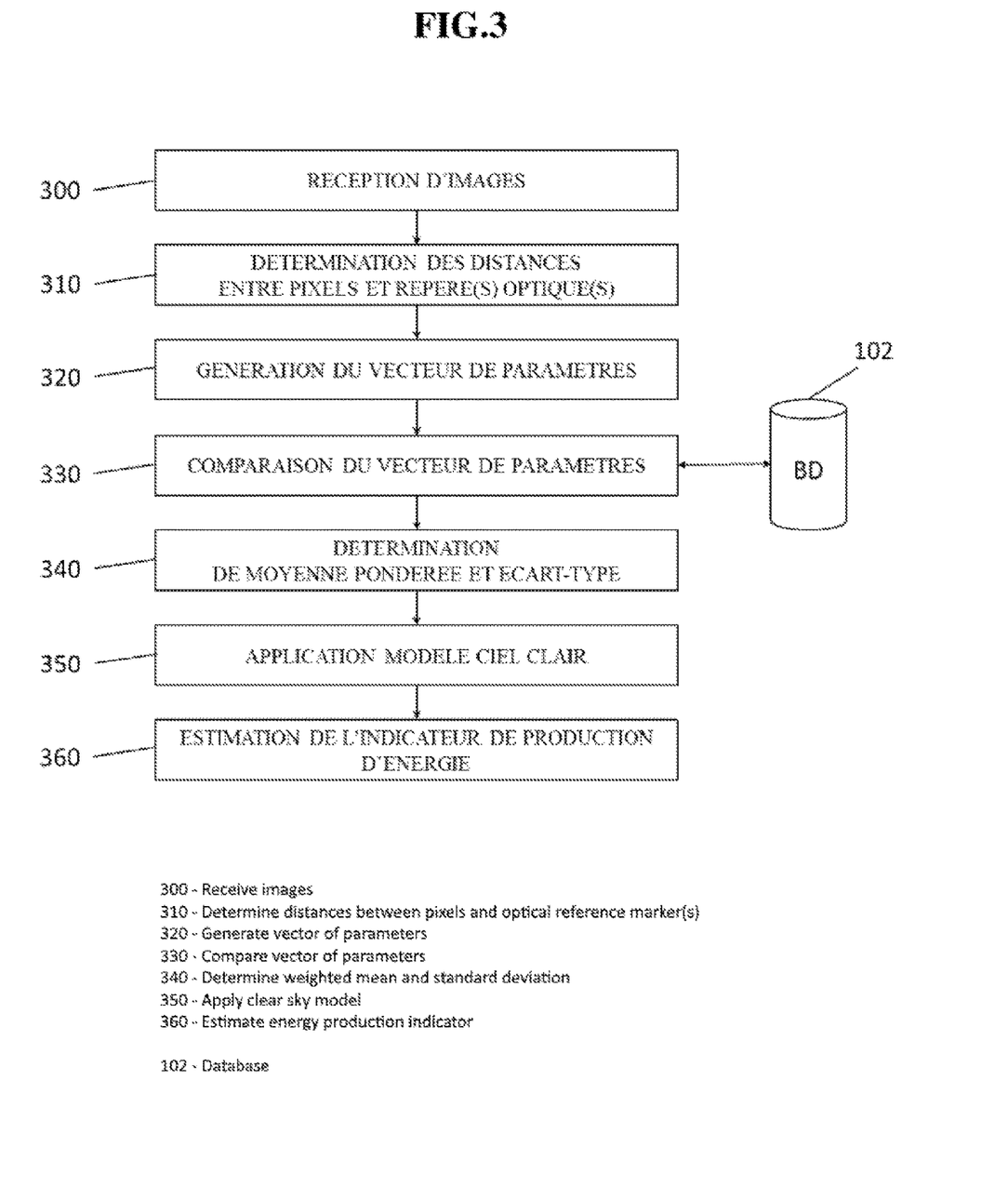
FIG. 3 represents a flowchart composed of an exemplary sequence of steps of the estimation method according to the invention.
Figure 5:
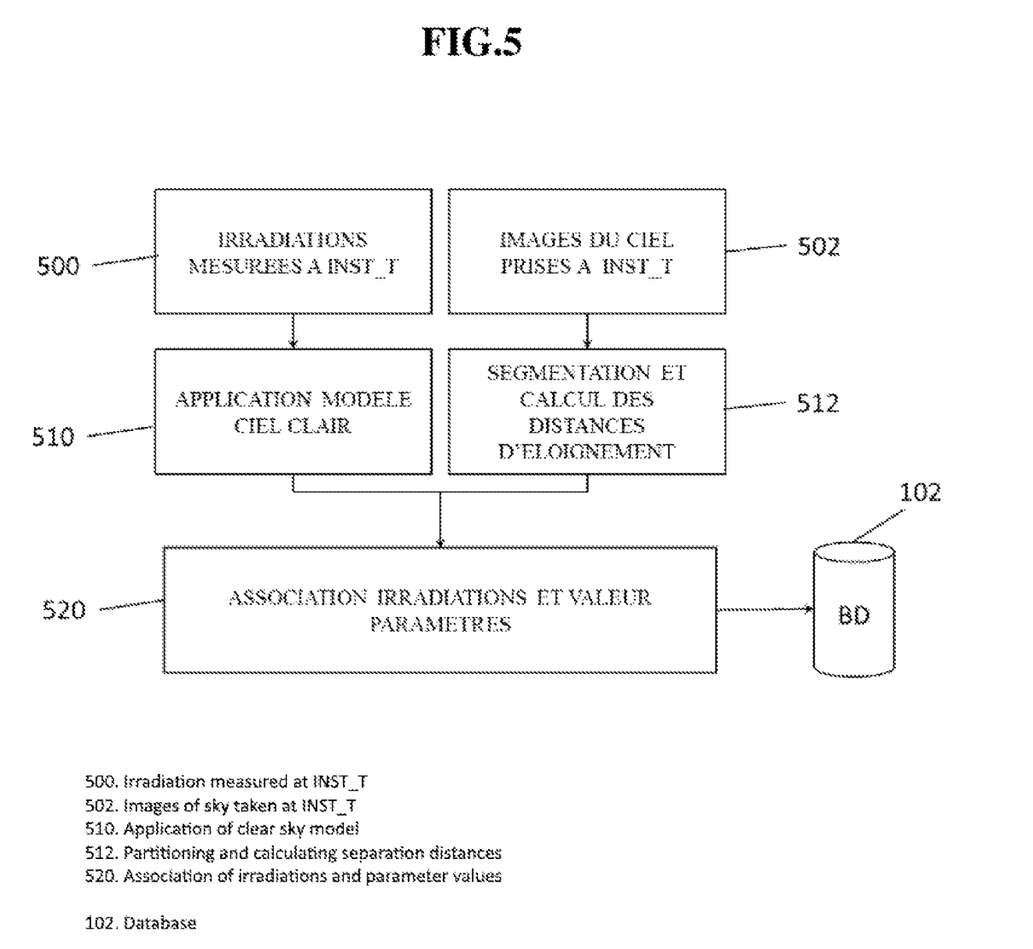
FIG. 5 represents a flowchart composed of an exemplary sequence of steps for constructing a database of predetermined parameters.
Figure 7A:
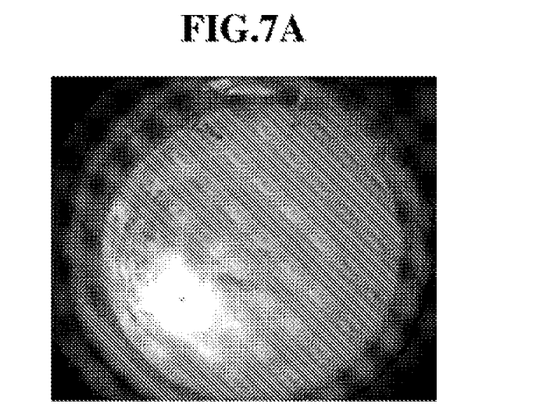
Figure 7B:
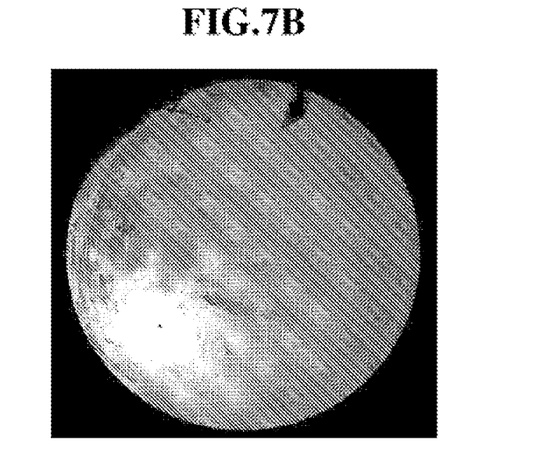
Figure 7C:
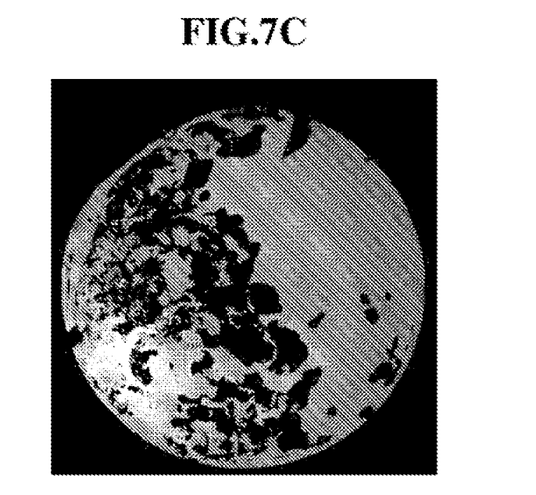

FIGS. 3, 5, and 7, described in detail below, can serve as flowcharts for the general algorithm of such a computer program.

BRIEF DESCRIPTION OF THE DRAWINGS

Other features and advantages of the invention will become apparent from examining the following detailed description and the appended figures in which:

FIG. 2 (FIGS. 2A to 2D) illustrate examples in which images of the sky are taken from the ground within an area of land where the photovoltaic panels are located;

FIG. 7 (FIGS. 7A-7C) illustrate examples of images taken from the ground in the area of land where the solar system is installed, and of an image generated from these images.

For clarity, the dimensions of the various elements represented in these figures are not in proportion with their actual dimensions. In the figures, identical references correspond to identical elements for the various embodiments described.

DETAILED DESCRIPTION

Figure 1:
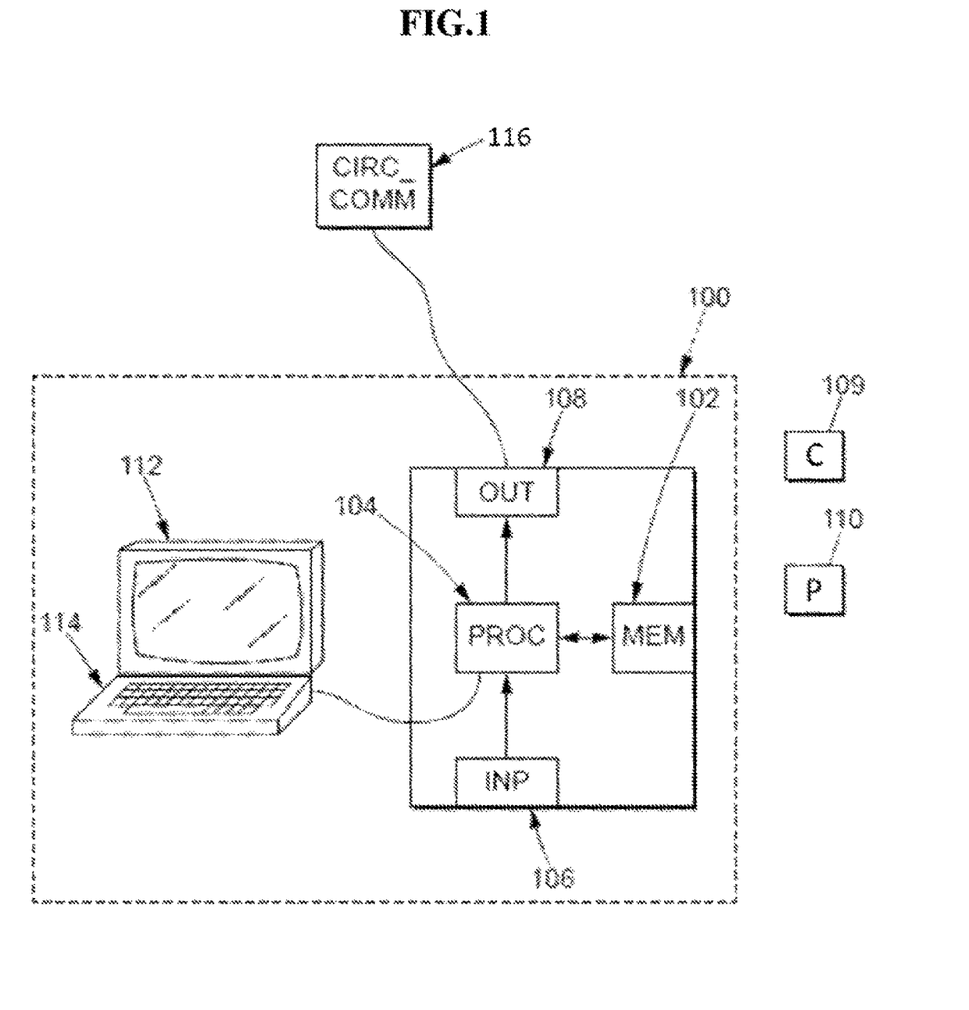
FIG. 1 shows an exemplary device for estimating an energy production indicator for a solar system according to an exemplary embodiment of the invention.

We will first refer to FIG. 1 which illustrates an exemplary device for estimating an energy production indicator for a solar system according to an exemplary embodiment of the invention.

In this embodiment, the device includes a computer 100, comprising a memory 102 for storing:
instructions for implementing the method,
images of the sky,
predetermined parameters associated with energy production indicators, and
temporary data for carrying out the various steps of the method as described above and detailed below.

The computer further comprises a data processing unit 104. This data processing unit may be a circuit, for example such as:
a processor capable of interpreting instructions in the form of a computer program, or
a circuit board in which the steps of the method of the invention are defined in the silicon, or
a programmable chip such as a FPGA ("Field-Programmable Gate Array").

This computer 100 also includes:
an input interface 106 for:
receiving images of the sky taken from the ground within an area of land containing with the solar system, for example by an image capture device such as a video camera 109 or still camera,
actual solar radiation data at the ground in the area of land, or actual energy production data of the solar system,
an output interface 108 for supplying a remote device 116 with control commands or estimation results depending on the method.

The solar system may, for example, be one or more solar panels 110 installed in the area of land from which the images of the sky are taken by the camera 109. The solar system may be configured to measure an actual energy production and to communicate this to the computer 100 via a communication link with the input interface 106.

The camera 109 may be located at the same location as the solar system or within an area around the solar system, for example at a location less than or equal to a radius of several kilometers (1 to 10 km for example) from the solar panels 110. Prior calibration of the camera may be performed, to map each pixel of the image to determined viewing angles (elevation, azimuth) so that the captured images are representative of the sky over the solar system.

For easy user interaction, the computer may also include a screen 112 and a keyboard 114. Of course, the keyboard is optional, particularly in the context of a computer in the form of a touchpad or smart phone, for example.

Typically, the remote device 116 can be a service platform or a client terminal capable of receiving the estimates sent by the device via the output interface 108. For this purpose, the device 116 may include a communication interface capable of receiving data communicated by the device and a data processing unit for interpreting the data. Thus, the data for estimating an energy production indicator that are received by the remote device 116 can be used by the latter to manage and anticipate the production of the solar system. As an illustrative example, a user can receive production estimates on his or her phone, for the photovoltaic panels installed on the roof of his or her home. The user can thus optimize consumption by anticipating the energy production of the panels on the basis of the estimated production. Various services can be offered to users according to the various possible interpretations of the estimates received by the remote device 116.

The interface 106 may also receive data from a pyranometer, concerning the actual solar radiation on the ground, or energy production data for the solar panel itself. For example, these data may be a raw irradiation value measured by the pyranometer near the solar panels 110, or a raw irradiation value deduced from the actual energy production of the panels 110. These data can in particular enable correcting the energy production indicators associated with the predetermined parameters, as described below. Such a correction may be performed only once for data calibration, or over time passes for retroactive correction.

In FIG. 2 (FIGS. 2A to 2D), there are illustrated examples in which images of the sky are taken from the ground within an area of land where photovoltaic panels are located such as panels 110, and which are received by the computer 100 via the interface 106.

Figure 2A:
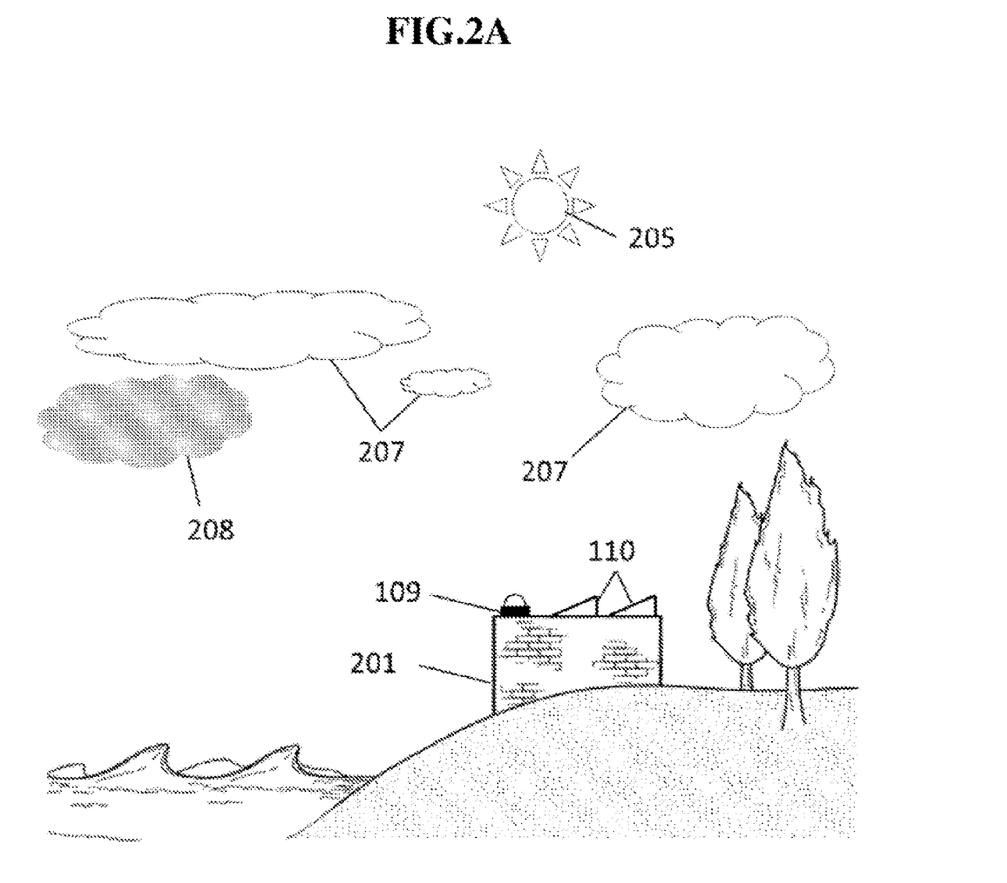

FIG. 2A represents a situation in which the solar panels 110 are for example installed on the roof of a building 201 (typically the home of a user). In this example, the camera 109 is placed near the solar panels 110, on the roof of the building 201, and is oriented towards the sky in order to capture images from the ground in the area of land in which the panels 110 are located.

However, in other possible embodiments, the camera 109 may be placed:
in the exact same location as the solar panels 110, or
within an appropriate perimeter around the panels.

The area of land in which is located a solar system such as panels 110 can be defined by a space around said system in which an image of the sky taken from the ground corresponds to the sky actually above the solar system. Indeed, in order to estimate the production of the solar system, it is necessary that the image taken from the area of land is representative of the sky actually above the system.

It should be noted, however, that the closer to the solar system the images of the sky are taken, the more the images taken will be representative of the sky above the solar system, which enables obtaining a better estimate of the energy production indicator.

The camera 109 here is a video camera having a fisheye lens (field of view greater than 170 degrees). In other alternatives, the camera can be an image capture device (a still camera or a webcam for example) with a fish eye lens or a lens having a field of view of less than 170 degrees. The camera 109 is oriented towards the sky in order to capture images of the sky containing elements such as the sun 205, white clouds 207, and dark clouds 208.

Figure 2B:
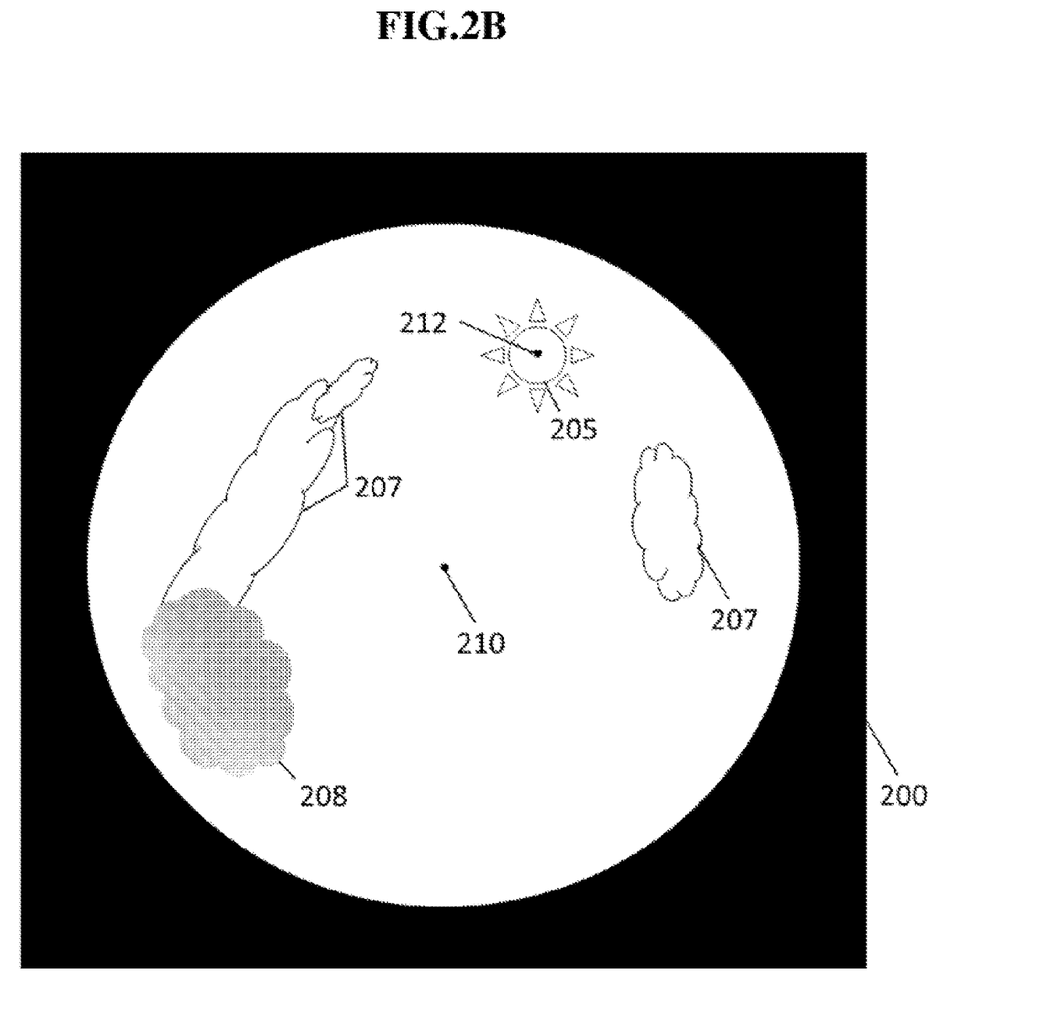

FIG. 2B shows an image 200 taken by the camera 109. The image 200 includes a first optical reference marker 210 corresponding to the optical center of the camera 109, and a second optical reference marker 212 corresponding to the location of the center of the sun 205 in the image. The image 200 is representative of the sky conditions above the panels 110. Using the image 200, it is possible to analyze the pixel values to determine what type of sky element (clear sky, sun 205, white clouds 207, dark clouds 208) corresponds to each pixel of the image.

Figure 2C:
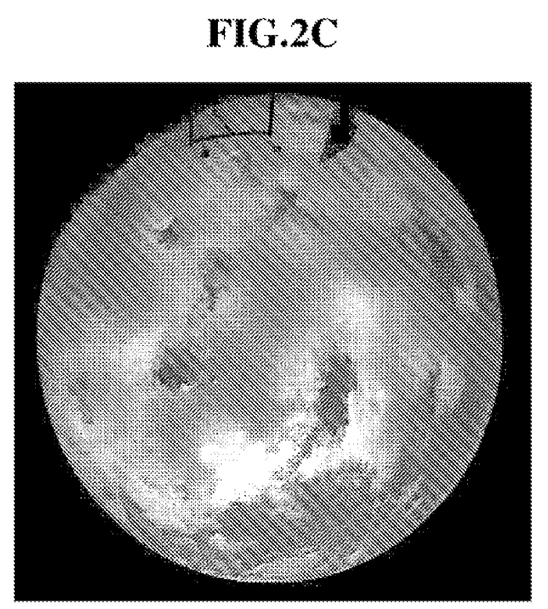
Figure 2D:
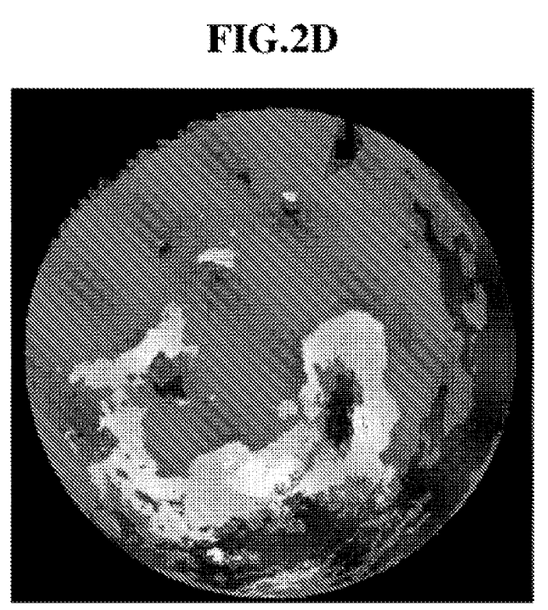

FIG. 2C shows another example image of the sky taken by the camera 109, and FIG. 2D shows the image after processing the pixel values of the image. This processing may consist of:

identifying the pixel values of the image, determining which sky element corresponds to the pixel values (clear sky, white cloud, dark cloud, disk of the sun, circumsolar region), classifying the pixels, in a vector of parameters, according to the sky element determined for their value, displaying the pixels of the image in a color corresponding to the sky element to which they were assigned (for example red for the disk of the sun, yellow for the circumsolar region, blue for clear sky, cyan for white clouds, and purple for dark clouds).

This processing of the image taken by the camera corresponds to dividing the pixels according to sky element categories corresponding to at least the sun, clouds, and a clear sky. They may be supplemented by other elements such as those mentioned above: light or dark clouds, the center of the sun, the disk of the sun, circumsolar region, etc.

We now refer to FIG. 3 which represents a flowchart composed of an exemplary sequence of steps of the method for estimating an energy production indicator for a solar system.

Step 300 corresponds to receiving images of the sky taken by the camera 109. The received images contain at least one optical reference marker which may be:

the optical center of the camera when the lens is a fish eye lens, the center of the image when the camera lens has a field of view of less than 170 degrees, the location of the sun in the image.

In a step 310, the received images can be processed to extract pixel values and to determine the location of the pixels of the images. The image obtained from the received images may directly be one of the received images or may be an image generated from the received images, as detailed below. It is then possible to determine, with reference to the optical reference marker(s) of the image, the distance between the located pixels. This distance is typically determined as the number of pixels between the located pixel and the optical reference marker, or else an angle of elevation, or other.

As stated above, the optical reference marker in the image can be the sun. The distance to the sun of the pixels corresponding to light and dark clouds may also be determined. This distance may be determined in particular between the center of the sun and the position of the pixel in the image.

Next, a step 320 of generating the vector of parameters may consist of classifying the pixels of the image according to the extracted values and the determined distances. The parameters contained in the vector may respectively correspond to sky element categories such as those mentioned above: clear sky, white cloud, dark cloud, disk of the sun, circumsolar region.

The vector of parameters in which the pixels are classified may include:

a first category of parameters corresponding to a clear sky, in which are classified the pixels for which the extracted value:

is within a first range of pixel values, or exceeds a first threshold value, a second category of parameters corresponding to the sun, in which are classified the pixels that are close to the sun (for example within a specified radius) for which the extracted value:

is within a second range of pixel values, or exceeds a second threshold value, a third category of parameters corresponding to clouds, in which are classified the pixels for which the extracted value:

is within a third range of pixel values, or exceeds a third threshold value.

Moreover, the third category of parameters corresponding to clouds may include at least two sub-categories for distinguishing dark clouds from white clouds. The pixels are assigned to the first or second sub-category depending on whether its value is less than or greater than a threshold.

For example, the threshold bounding the first and second sub-category may be for example a luminance value whose signal intensity I is defined by the following linear combination (where the coefficients are the ITU-R BT.709 standardized universal weights):

$$I = 0.2126\ Ir + 0.7152\ Iv + 0.0722\ Ib$$

The threshold bounding the second and third category of parameters may in turn be a luminance value whose signal intensity I is defined by the following linear combination:

$$I = 0.2989\ Ir + 0.5870\ Iv + 0.1140\ Ib$$

However, it should be noted that the thresholds and ranges that characterize the various categories and sub-categories of parameters can change, for example according to the image capture device used.

When generating the vector of parameters, coefficients may be associated with pixels. These coefficients take into account the sky element category corresponding to the pixel as well as the pixel distance relative to the optical reference marker.

For example, the coefficients C1 and C2 associated with the pixels are defined by the following equations:

$$C1 = \Sigma(ndg(\text{pixel}) * \sin(\gamma)) / \Sigma \sin(\gamma)$$

$$C2 = \Sigma(\text{luminance}(\text{pixel}) * distS) / \Sigma distS$$

where "ndg" is the value of the pixels in grayscale and $\gamma$ is the elevation for each pixel, and where "luminance" is the value of the pixels in luminance and distS corresponds to the distance from the pixel to the sun in the image.

In step 330, the parameters of the vector are compared with predetermined parameters stored in the memory 102. In the memory 102, the predetermined parameters in question are respectively associated with energy production indicators. After this comparison, it is possible to position the vector of parameters relative to the history consisting of predetermined parameters. Further operations can thus be performed in order to estimate more accurately the energy of the solar system based on the predetermined parameters to which the generated vector was compared.

In step 340, a weighted mean of production indicators can be obtained, the weight being a function of the distance of the predetermined parameters associated with the indicators, relative to the vector of parameters. Typically, the weight of the indicators can be:

increased for predetermined parameters near the vector, and decreased for the other predetermined parameters.

As an illustrative example, the weighted average is called Kmoy and is defined for n vectors of parameters according to the equation (where poids means weight):

$$Kmoy = \frac{\sum poids(k) * K(k)}{\sum poids(k)}$$

where K(k) is the $k^{th}$ associated energy production indicator and k=1 ... n. The variable poids(k) can be calculated from a Gaussian kernel given by:

$$poids(k) = e^{-dpond(k)^2/h^2}$$

where h is a variable relating to the kernel width and dpond corresponds to the weighted distance between the predetermined parameters X and the vector of parameters x:

$$dpond(k) = \sqrt{\frac{\sum_{i=1}^{5} px(i) * (X(k, i) - x(i))^2}{\sum_{i=1}^{5} px(i)}}$$

The weights px allow giving more or less emphasis to different parameters depending on the type of irradiation to be estimated (total, direct, or diffuse). Other kernels can be used, for example such as an exponential decay or a uniform kernel (i.e. constant over a certain distance then zero beyond that distance).

The weighted average Kmoy may be determined:
for the set of predetermined parameters, or
for only a portion of the predetermined parameters, for example only including:
the predetermined parameters located within a given radius around the vector of parameters, or
the predetermined parameters closest to the vector, starting from a given distance around the vector of parameters.

Figure 4:
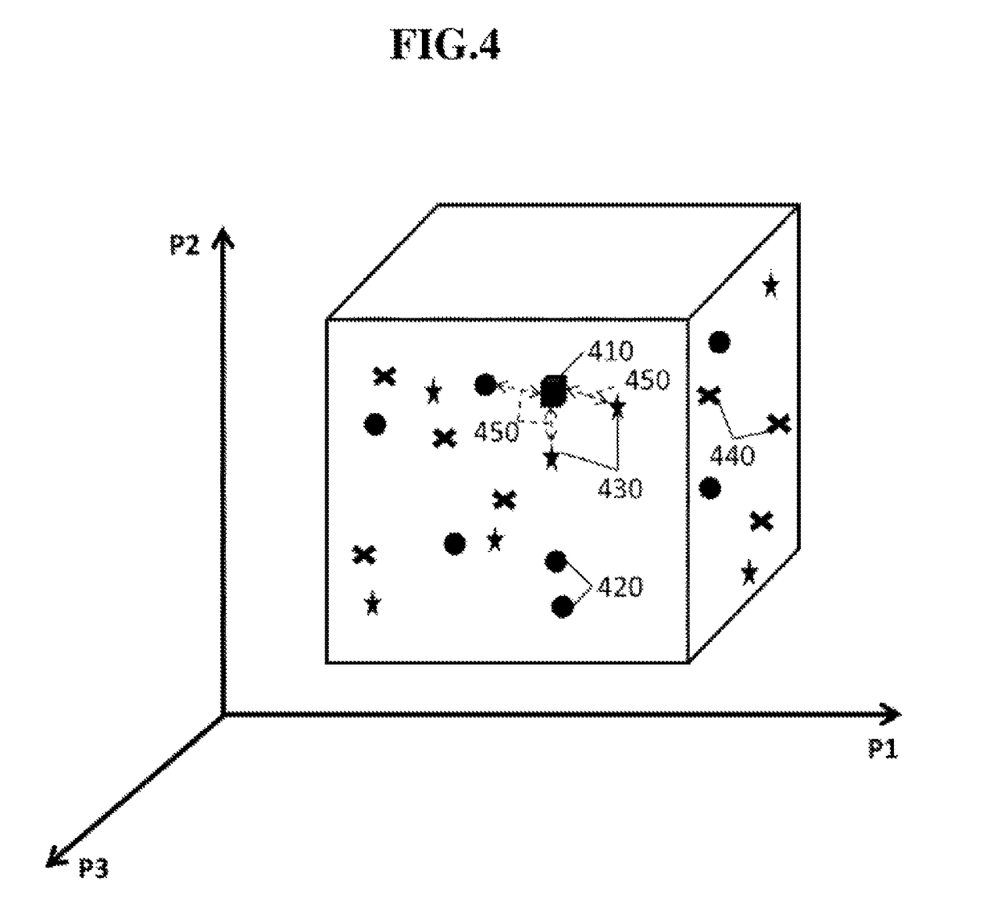
FIG. 4 is a graphical representation of a database containing predetermined parameters.

For example, FIG. 4 graphically represents, as a hypercube, a database containing predetermined parameters associated with photovoltaic production indicators. These predetermined parameters are shown in a reference system containing axes PI, P2, and P3, each axis corresponding to a category of parameters such as clear sky, white clouds, dark clouds, and sun. The generated vector of parameters is represented as a cube 410 and the predetermined parameters are illustrated by circles 420, stars 430, and x's 440.

In this example, the weighted average Kmoy is calculated from the predetermined parameters that are within a reduced radius 450 around the vector 410.

In step 340, a standard deviation of the energy production indicator estimation error can be determined. This standard deviation enables defining a confidence interval (i.e. an expected energy production indicator range) around the production indicator estimate, with upper and lower bounds. This standard deviation can be calculated in particular from the weighted root mean square deviation between the energy production indicators of predetermined parameters and the estimated energy production indicator, the mean being weighted according to the differences in value between the parameters of the generated vector and the predetermined parameters.

In one possible embodiment, the equation for calculating the standard deviation σ is:

$$\sigma = \sqrt{\frac{\sum poids(k) * (Kmoy - K(k))^2}{\sum poids(k)}}$$

It should be noted that the confidence interval is more accurate when the predetermined parameters considered for the calculation of the means Kmoy are numerous and are close to the vector of parameters 410.

In a step 350, the vector of parameters, the means Kmoy, and/or the standard deviation σ are standardized using a clear sky model (model of radiation values for a clear sky, taking into account the evolution in the solar zenith).

Thus in a step 360, the energy production indicator for the solar system can be estimated based on energy production indicators of the predetermined parameters compared to the vector.

In FIG. 5, a flowchart composed of an exemplary sequence of steps is represented for the construction of a database of predetermined parameters.

In steps 500 and 502, irradiation measurements at a given moment INST_T and images of the sky taken at the same moment in the area of land are received.

In step 510, a clear sky model is applied to the received measurements in order to standardize the measurements and take into account the evolution in the solar zenith.

In a step 512, the pixel values are extracted and mapped in the received images. Parameters are then calculated based on the extracted values, and distances are determined according to sky element categories such as clear sky, white cloud, dark cloud, disk of the sun, circumsolar region.

In step 520, the normalized irradiation measurements are associated with predetermined parameters. The irradiation measurement associated with the predetermined parameter is an energy production indicator for the solar system. The predetermined parameters thus generated are then stored in the memory 102.

Additionally or alternatively, the energy production indicator may be actual electricity production measured at the solar system, or other.

Figure 6:
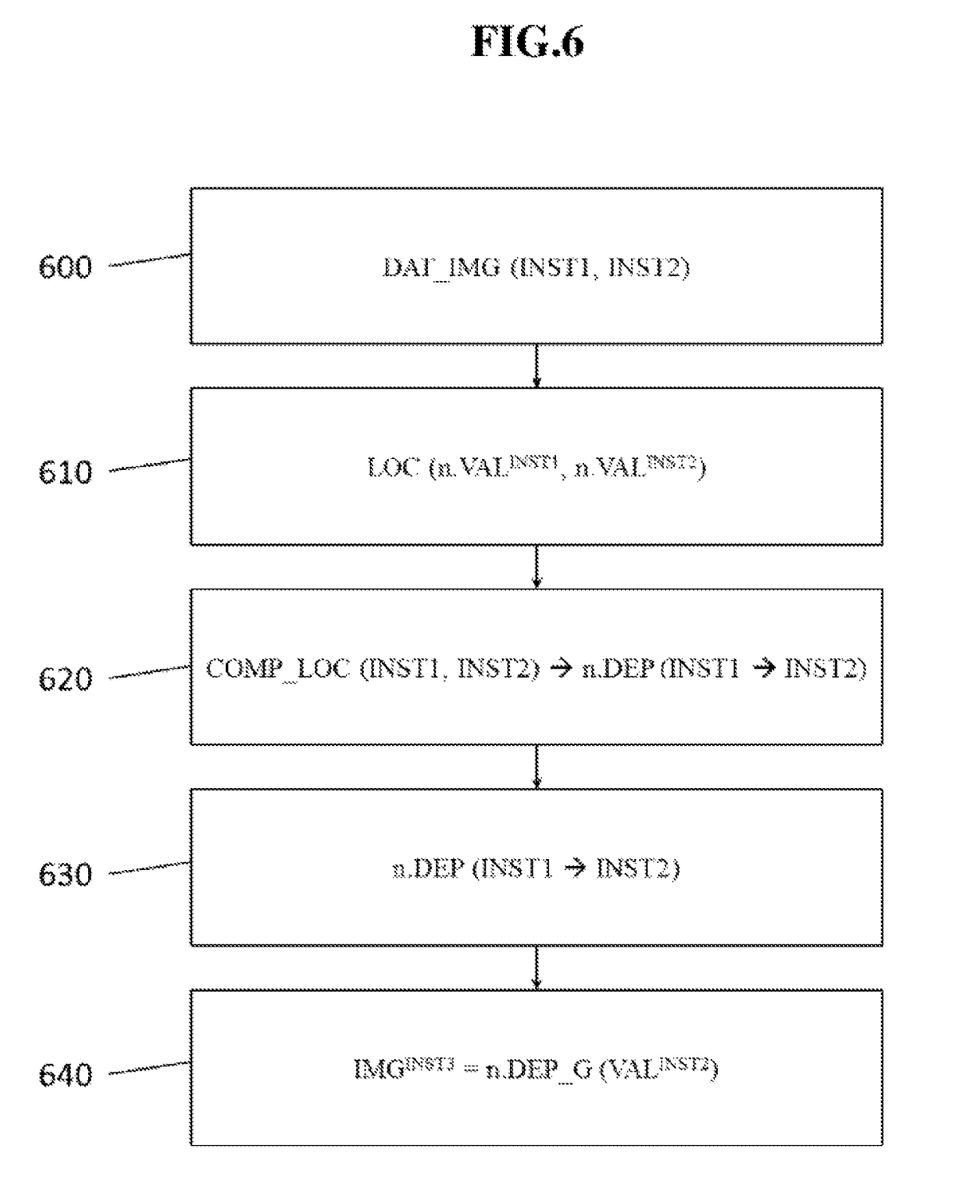
FIG. 6 represents a flowchart composed of an exemplary sequence of steps for generating an image of the sky from images taken from the ground in the area of land.

Referring now to FIG. 6 which represents a flowchart composed of an exemplary sequence of steps for generating an image of the sky from images of the sky taken from the ground in the area of land.

In step 600, the data DAT_IMG of images taken at a first moment INST1 and a second moment INST2 are received by the interface 106 of the device. The data DAT_IMG include information on the values and locations of pixels of images taken by the camera 109 at moments INST1 and INST2. Moment INST1 is considered to precede moment INST2.

Based on the data DAT_IMG, n pixel values at moments INST1, INST2 can be obtained, n being an integer (greater than or equal to zero): $n.VAL^{INST1}$, $n.VAL^{INST2}$. For example, n can be the number of pixels of the images taken at moments INST1 and INST2, a raw luminance value VAL being associated with each of the n pixels of moment INST1 and moment INST2.

In a step 610, the location of the obtained values $n.VA^{INST1}$ and $n.VAL^{INST2}$ is determined. This determination can be done by identifying the position of each of the n values measured at moments INST1 and INST2.

In a step 620, the determined locations for the values of moments INST1 and INST2 are compared with each other (via a function called COMP_LOC for example). The located values of moment INST1 are compared to the located values of moment INST2 to determine the movements DEP of the n values between moment INST1 and INST2.

In one possible embodiment, n movements DEP of the n located values are determined by identifying the movements followed by values at the same level at moments INST1 and INST2.

Alternatively, only p movements DEP may be determined from the located values, p being a positive integer strictly less than n. This alternative is to be preferred for selecting certain values whose movement is to be determined, which eliminates calculating the movement of all values of the image and also eliminates calculation errors when a value at moment INST1 does not appear in the values of moment INST2. For example, it is possible to set an increment r such that vectors are only calculated every r pixels, thereby reducing the number of vectors calculated and thus the computing time and resources.

In a step 630, the movements DEP of the same pixel values between moments INST1 and INST2 are determined for the n pixel values.

Of course, in clear sky conditions (no clouds), the above movement values cannot be detected (they are zero) because the values will be identical at the first and second moments.

In a step 640, an image for a future moment INST3 (i.e. a time subsequent to the second moment INST2) is generated by applying the n movements n.DEP to the n pixels of the image taken at moment INST2.

The forecast horizon is defined according to the time between moment INST2 (at which the forecast for moment INST3 is performed) and moment INST3. The forecast horizon may be several minutes (5, 10, 15, or even 60 minutes for example).

In FIG. 7, examples are provided of images taken from the ground in the area of land where the solar system is installed, and an image generated from these images. In these examples, FIGS. 7A and 7B are respective shots taken at moment INST1 and moment INST2. Between moment INST1 and moment INST2, 10 seconds have elapsed for example, and the masking cloud cover has moved in the sky between these two moments.

The values of moment INST1 are compared to the values of moment INST2. Movements of the values between moment INST1 and moment INST2 can be determined by vectors. The vectors correspond to the movement of the masking cloud cover in the image, meaning the translational movement of the same pixel values between the first and second moments.

In FIG. 7C, the vectors determined between moments INST1 and INST2 have been applied based on the pixels of the image taken at moment INST2, to generate a future image at moment INST3, for example a 5 minute forecast horizon. This generated image is a prediction of future sky conditions. Application of the estimation method to the generated image enables forecasting a future electrical energy production, 5 minutes in the current case.

Figure 8:
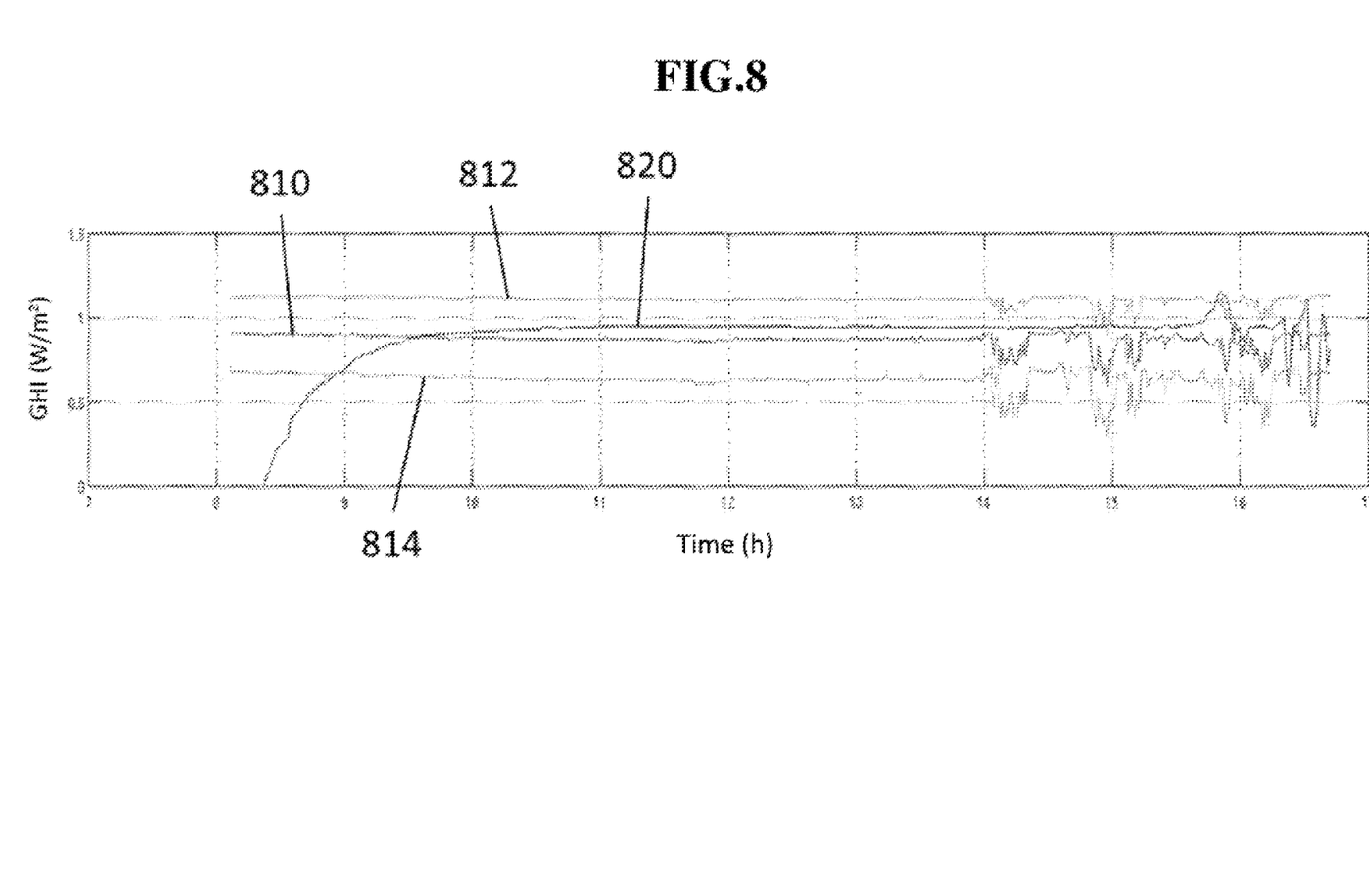
FIG. 8 represents examples of solar radiation curves measured, estimated, and forecast by the proposed estimation method.

We now refer to FIG. 8 in which examples of normalized total solar radiation curves (W/m$^2$) over time (hourly scale) are represented. These curves include:

a curve of solar radiation 810 predicted for a 5 minute horizon according to the proposed estimation method (i.e. images used for the estimate are the images forecast for a 5-minute horizon, said forecast images being generated from images of the sky taken by the camera 109, according to the above steps);

curves 812 and 814, corresponding to the upper and lower bounds of the confidence interval which can be calculated from the following standard deviation σ:

$$\sigma = \sqrt{\frac{\sum poids(k) * (Kmoy - K(k))^2}{\sum poids(k)}}$$

a curve 820 of actual and normalized measurements of radiation in the solar system (measured by an instrument such as a pyranometer for example, placed on the solar panels 110).

In this example, the energy production indicator is solar radiation. Note that the actual radiation measurements 820 are very close to the radiation values 810 predicted by the proposed estimation method.

This quality of the estimation and forecasting enabled by the method allows identifying and accurately anticipating the evolution of energy production indicators for the solar system. The production capacity of the solar system can thus be accurately determined, even for short horizons (5, 10, 15, or even 60 minutes).

Moreover, the confidence interval (the space between curves 812 and 814) allows predicting a range of values around the energy production indicator estimate, in particular in order to take into account any slight variations related for example to abrupt changes in weather conditions.

The invention has been described with reference to particular embodiments which are not limiting. Of course, the invention is not limited to the embodiment described by way of example and it extends to other variants. For example, the received images may be taken by several different cameras located at different positions in the area of land. The use of multiple cameras (which can be interconnected in a mesh communication network, for example) can help to more accurately predict the movements of masking cloud cover and can thus refine the estimates of future energy production. Such an embodiment also allows establishing a map of estimated radiation around the solar system or the set of solar systems considered.

The invention claimed is:

1. A method for estimating an energy production indicator for a solar system, said method comprising:
   a) receiving images of the sky taken from the ground in an area of land containing the solar system, each received image comprising at least one optical reference marker;
   b) extracting pixel values and determining pixel locations from pixels of an image obtained from the received images;
   c) determining distances between the pixels and the at least one optical reference marker of the image obtained from the received images;
   d) generating a vector of parameters from a classification of the pixels according to the extracted values and the determined distances;
   e) comparing the parameters of the generated vector with predetermined vectors of parameters, the predetermined vectors of parameters being respectively associated with energy production indicators;
   f) estimating the energy production indicator associated with the generated vector of parameters from the energy production indicators associated with the predetermined vectors of parameters based on the comparison.

2. The method according to claim 1, wherein, in f), the estimation of the energy production indicator for the solar system is further derived from a weighting of the energy production indicators associated with the predetermined vectors of parameters, the weighting being based on the differences in value between the parameters of the vector and the predetermined vectors of parameters.

3. The method according to claim 1, further comprising determining a range of energy production indicators that is based on a standard deviation calculated from the weighted root mean square deviation between energy production indicators associated with predetermined vectors of parameters and the estimated energy production indicator, the squared deviations being weighted according to differences in values between the parameters of the generated vector and the predetermined vectors of parameters.

4. The method according to claim 1, wherein the image comprises a first optical reference marker corresponding to the optical center of an image capture device used to capture the received images.

5. The method according to claim 1, wherein the image comprises a second optical reference marker corresponding to the location of the sun in the received images.

6. The method according to claim 1, wherein the vector of parameters comprises at least:
a first category of parameters corresponding to a clear sky,
a second category of parameters corresponding to the sun,
a third category of parameters corresponding to clouds.

7. The method according to claim 6, wherein the third category of parameters comprises:
a first sub-category of parameters corresponding to white clouds, characterized by pixels having a value greater than or equal to a threshold,
a second sub-category of parameters corresponding to dark clouds, characterized by pixels having a value below the threshold.

8. The method according to claim 6, further comprising determining a proportion of cloud cover in the image obtained from the received images, based on the pixels corresponding to the third category of parameters.

9. The method according to claim 1, wherein the image obtained from the received images in b) is an image generated according to the following:
from the received images, retrieving images taken at at least a first moment and a second moment, the first moment preceding the second moment;
determining the location of pixel values in the images respectively taken at the first and second moments;
comparing the locations of the pixel values at the first moment and the second moment;
determining the movements, between the first and second moments, of at least some of the located pixel values;
generating the image of the sky for a third moment based on the determined movements, the third moment being later than the second moment.

10. The method according to claim 1, wherein the received images are images taken from the ground in the area of land, by an image capture device fitted with a lens having a field of view greater than 170 degrees.

11. The method according to claim 1, wherein data concerning:
actual solar radiation at ground level in the area of land, or
actual energy production of the solar system,
is received, the received data being used to calibrate or correct the energy production indicators associated with the predetermined vectors of parameters.

12. A non-transitory computer-readable storage medium storing a computer program comprising instructions for implementing the method according to claim 1, when the program is executed by a data processing unit such as a processor.

13. A device for estimating an energy production indicator for a solar system, comprising at least:
an input interface for receiving images of the sky taken from the ground in an area of land containing the solar system;
a memory configured to store:
the received images of the sky, and
predetermined vectors of parameters respectively associated with energy production indicators;
a data processing circuit connected to the input interface and to the memory;
said data processing circuit being configured to implement the method according to claim 1.

14. The device according to claim 13, wherein the input interface is connected to an image capture device oriented towards the sky in the area of land, the image capture device being fitted with a lens having a field of view greater than 170 degrees.

15. The device according to claim 13, wherein the input interface is further configured to receive data concerning:
actual solar radiation at ground level in the area of land, or
actual energy production of the solar system.

* * * * *